(12) United States Patent
Gabriel

(10) Patent No.: US 6,375,124 B1
(45) Date of Patent: Apr. 23, 2002

(54) AUTOMATICALLY-ACTUATED CARGO AND PERSONNEL SCOOPING APPARATUS WITH TECHNIQUES FOR ALLEVIATING THE EFFECTS OF WIND GUSTS

(76) Inventor: Edwin Z. Gabriel, 91 Mt. Tabor Way, Ocean Grove, NJ (US) 07756-1437

( * ) Notice: Subject to any disclaimer, the term of this patent is extended or adjusted under 35 U.S.C. 154(b) by 0 days.

(21) Appl. No.: 09/366,263

(22) Filed: Aug. 2, 1999

(51) Int. Cl.[7] .............................................. B66C 1/00
(52) U.S. Cl. ................ 244/137.4; 294/81.4; 294/86.41; 294/118
(58) Field of Search .......................... 244/137.1, 137.4, 244/118.1, 76 C; 294/86.41, 81.4

(56) References Cited

U.S. PATENT DOCUMENTS

| | | | | |
|---|---|---|---|---|
| 4,848,703 A | * | 7/1989 | Coulson et al. | 244/137.1 |
| 5,040,748 A | * | 8/1991 | Torre et al. | 244/158 |
| 5,209,538 A | * | 5/1993 | Gabruel | 244/118 |
| 5,826,825 A | * | 10/1998 | Gabriel | 244/137.1 |
| 5,868,357 A | * | 2/1999 | Gabriel | 244/137.1 |

* cited by examiner

*Primary Examiner*—Charles T. Jordan
*Assistant Examiner*—Christian M. Best

(57) ABSTRACT

This is a relatively simple load-lifting apparatus, tongs-like in appearance with a larger lower portion for grabbing loads of various sizes. It has two embracing halves, pivoted at a selected distance from the apparatus' top. It is designed to safely and reliably hold a person between its lower portions, without injuring one who may be disabled. Sensors have been added to enable it to sense the distance of the apparatus' lower portions from the object to be scooped up. When in range of the object its lower portions automatically separate, in order not to make contact with it, while being lowered. In its descent the apparatus could sway under the influence of wind gusts, thus not being able to precisely straddle the object to be retrieved. A technique using air bursts from solenoid-operated valves, mounted selectively on the apparatus to reduce the effect of wind-gusts, is provided. Compressed-air tanks are provided to supply the air to the valves. The operation of the air valves is controlled by sensitive microswitches with their switch-blades protectively exposed to the atmosphere. A single gyro-scope may be added to the above, with its spinning axis vertical, to sense the swaying motion and take appropriate action to reduce the apparatus' swaying from any cause, including from motions of the hovering aircraft. The above wind-gust alleviation technique has been applied to lightweight aircraft, for safer landing under severe wind-gust conditions. The air valves, when installed in the aircraft's belly, also could prevent the aircraft from nosediving, and for its more safely fulfilling a personal receiving mission.

12 Claims, 13 Drawing Sheets

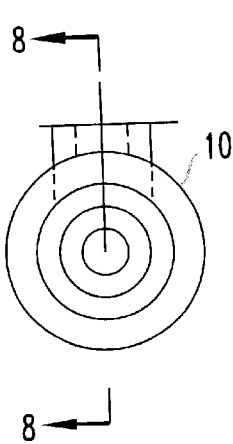
FIG.7
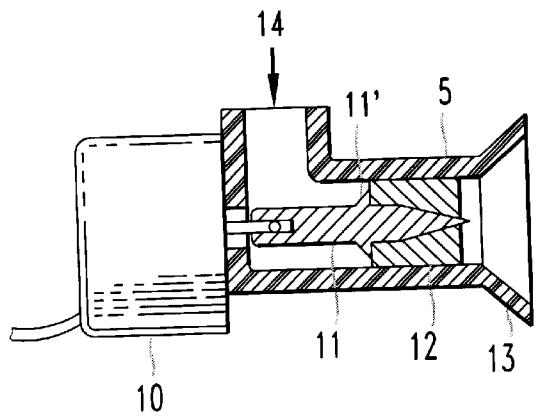
FIG.8
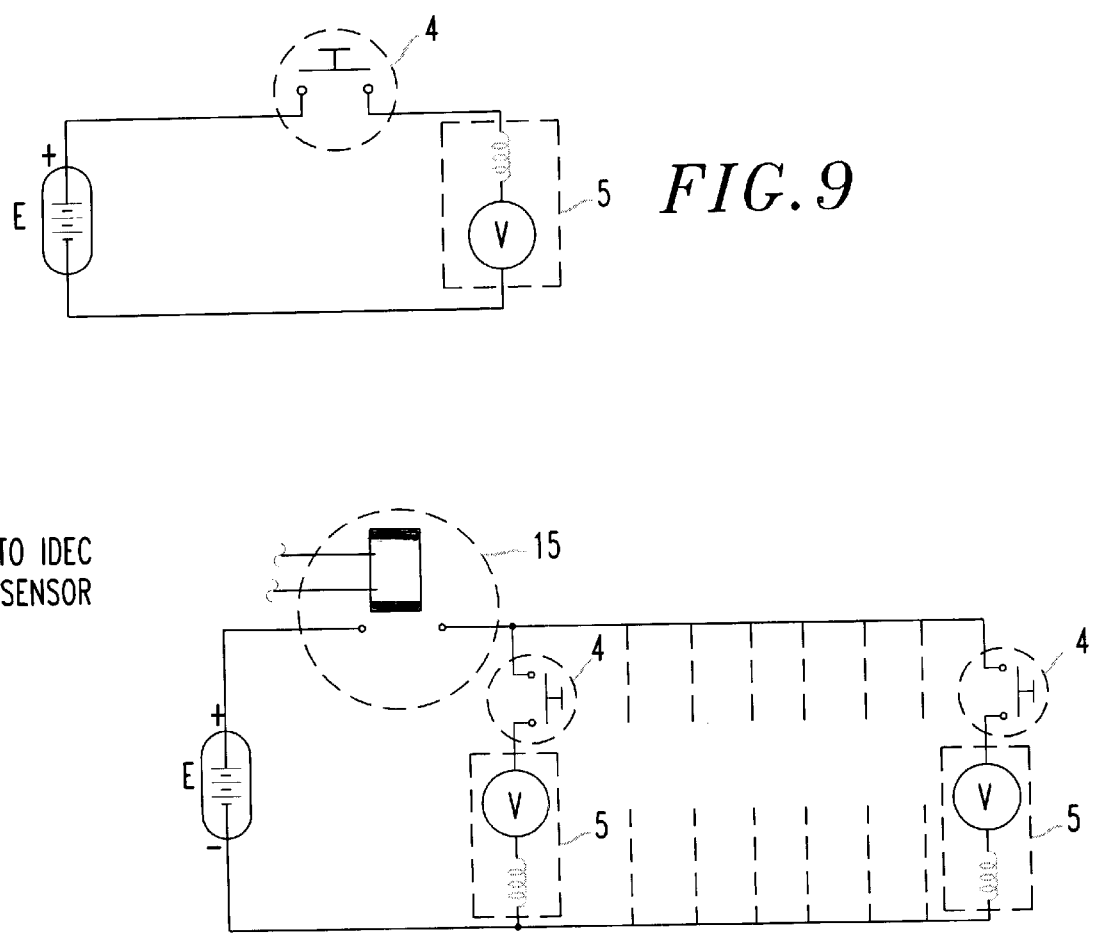
FIG.9
FIG.10

(SECTION)

(SECTION)

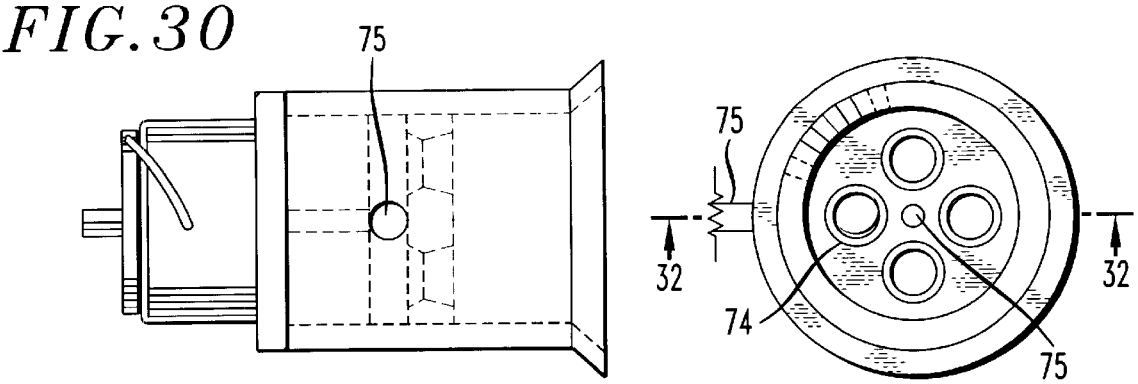
FIG.30
FIG.31
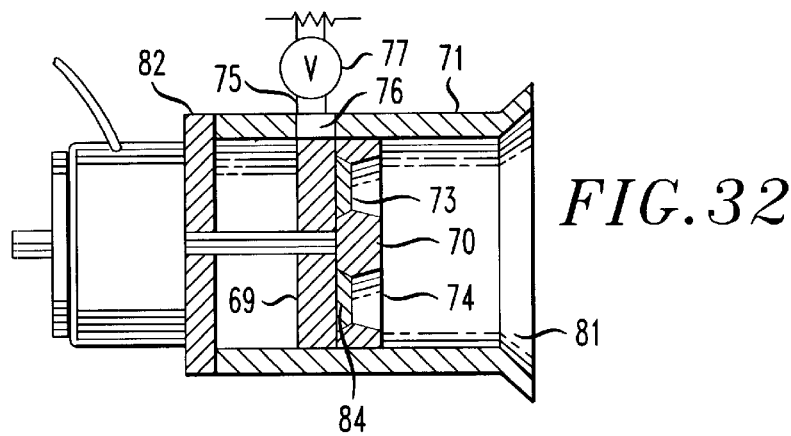
FIG.32
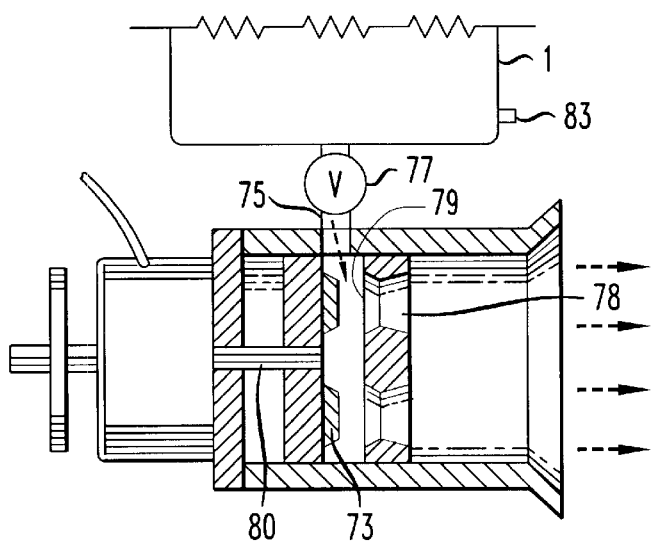
FIG.33

AUTOMATICALLY-ACTUATED CARGO AND PERSONNEL SCOOPING APPARATUS WITH TECHNIQUES FOR ALLEVIATING THE EFFECTS OF WIND GUSTS

CROSS REFERENCES TO RELATED APPLICATIONS

This is not a continuation-in-part of a previous application, not one that is co-pending.

RIGHTS TO INVENTIONS MADE UNDER FEDERALLY-SPONSORED OR STATE-SPONSORED RESEARCH AND DEVELOPMENT

Gabriel used his own resources on every phase of this project.

None of the work on this invention was performed under any Federally-Sponsored or State-Sponsored research and delvelopment.

BACKGROUND OF THE INVENTION

1. Field of the Invention

This invention is in the field of load-snatching, material handling and personnel rescuing apparatus, in which the entire load is scooped up without the need of load cables and hooks. The apparatus may be suspended from a helicopter. The pilot may assist in the load-lifting and releasing operations. This disclosure with illustrations describes how the task of retrieving a load or rescuing a person can be performed more precisely, with less possibility of the suggested apparatus causing any injury to the load. In Gabriel's previous invention, U.S. Pat. No. 5,868,357, dated Feb. 9, 1999, resilient, flexible fingers or extensions thereof, assist in obtaining the above goal of not causing injury to the load. However, no provision has been made to prevent swaying of the load, while suspended, under wind-gust conditions.

2. Description of Prior Art

The inventor is only aware of patents issued under his name that relates to his present invention. U.S. Pat. No. 5,868,357 has automatic features, such as an ultrasonic distance sensor, bipolar magnets at the hammerheads above the main pivot pin to achieve either repulsion or attraction of the hammerheads, and strain gages mounted on the grasping fingers to achieve sensitivity, but it does not possess wind-gust alleviation ability while suspended, to avoid swaying of the suspended apparatus. It is not the object of this invention to repeat the features of apparatus' previous Gabriel patents, such as inflated pillows for securing the scooped up load or inclusion of an electric motor to perform either the separation or bring together of the apparatus' lower portions. The surveillance camera 176, U.S. Pat. No. 5,826,825, may be missing in this invention, but it could be suspended from a compressed air tank mounted on the surface of the main pivot pin of the apparatus.

None of Gabriel's previous inventions, such as U.S. Pat. No. 5,209,538, incorporates a wind gust alleviation technique for an apparatus subject to such climatic conditions, needed for precisely lowering the apparatus over an object to be scooped up.

SUMMARY OF THE INVENTION

This is a multi-purpose cargo, personnel lifting apparatus with automatic loading and unloading capability, suspended from either a derrick, crane or hovering air craft.

Because of its ability to pick up the entire load automatically and remotely without the aid of ground personnel, in the presence of wind gusts, this apparatus could be of much assistance to the military for rescue missions of personnel in the battlefield, in rough seas, on mountainous regions, on roofs of burning buildings or in areas of toxic fumes.

The load on a surface may be scooped up remotely with the aid of distance sensors, a surveillance camera and a CRT monitor in the helicopter cockpit. In order to perform this task successfully, the aircraft needs to hover over a ground reference within a prescribed deviation therefrom, with the aid of flight information display in the cockpit and an aircraft stabilization system which would minimize the tendency for the slung load to oscillate. Under the effect of wind gusts, the suspended load would oscillate back and forth, regardless of the capability of the aircraft's stabilization system. In order to prevent the load from oscillating, a technique is needed to counter the effects of wind gusts, regardless of their direction. At the time an apparatus is about to be positioned over an object to be retrieved is really the critical time for the apparatus not to sway back and forth under the effect of wind gusts. A technique using tanks or cannisters with compressed air and outlets to counter the effects of wind gusts has been designed. Sensitive microswitches, which close the circuits of solenoid-operated valves allow bursts of high velocity air to be emitted opposing the effect of wind gust on the apparatus. Hence, the apparatus can be more safely, reliably positioned over the object to be retrieved or rescued.

BRIEF DESCRIPTION OF THE DRAWINGS

For the purpose of illustrating the precision capability of locating, positioning and scooping up a load with this apparatus, the following drawings show forms which are presently preferred. It is to be understood that this invention is not necessarily limited to the precise arrangement, instrumentalities and field of utility as therein demonstrated.

FIG. 7 is an end view of a solenoid operated valve.

FIG. 8 is a side view thereof.

FIG. 9 is a circuit with a single microswitch, single solenoid valve and voltage supply.

FIG. 10 is a circuit with 8 microswitches, 8 solenoids, a relay operated by an ultrasonic sensor and a voltage supper. A single microswitch in series with a solenoid valve are in parallel with seven other such series circuits.

FIG. 30 is a side view of another solenoid-operated air valve.

FIG. 31 is an end view thereof.

FIG. 32 is a section of the valve taken along line 32—32 of FIG. 31.

FIG. 33 is the same section of the valve in its open position to allow air or gas, such as helium to pass through.

DESCRIPTION OF A PREFERRED EMBODIMENT

Figure 1:
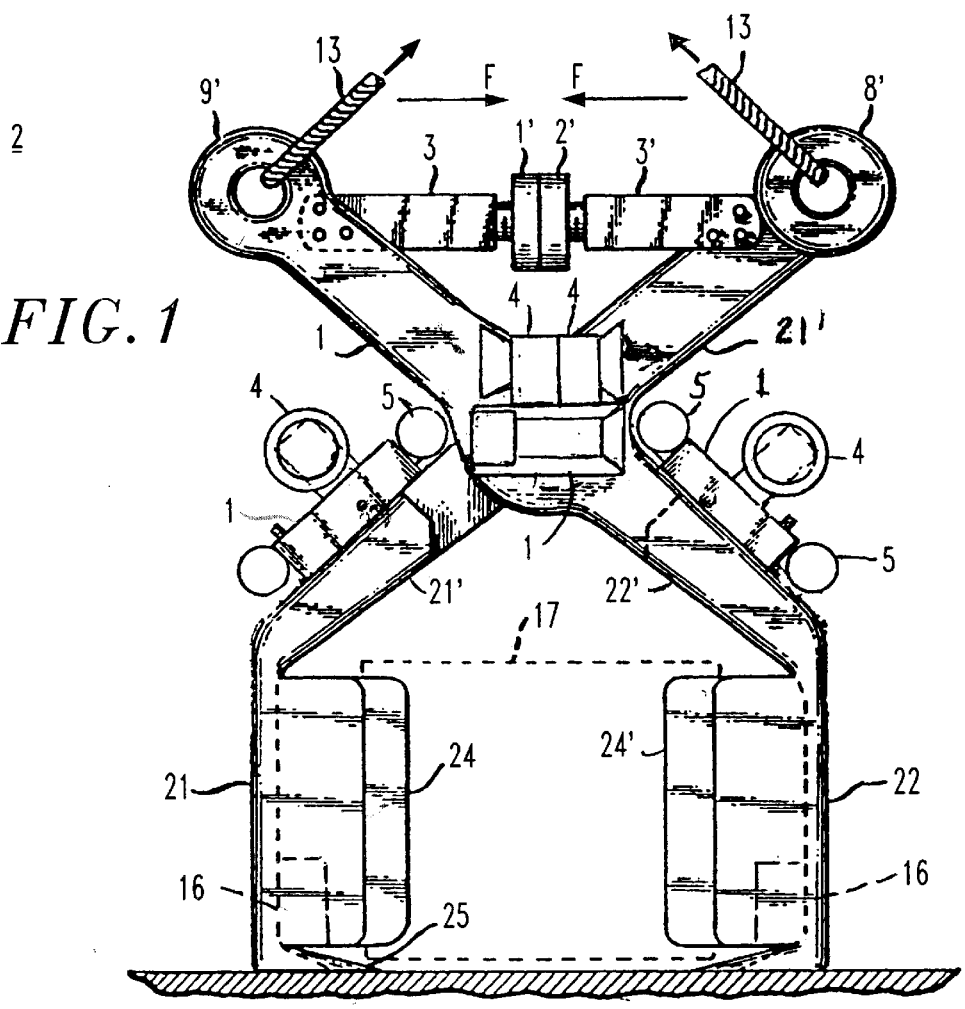
FIG. 1 is a front view assembly of the apparatus showing the upper portions, the pivot pin, with wind-gust alleviation devices attached and the lower portions with cushions fastened to their walls and additional wind gust alleviation devices mounted above the unbendable knees of the lower portions.
Figure 2:
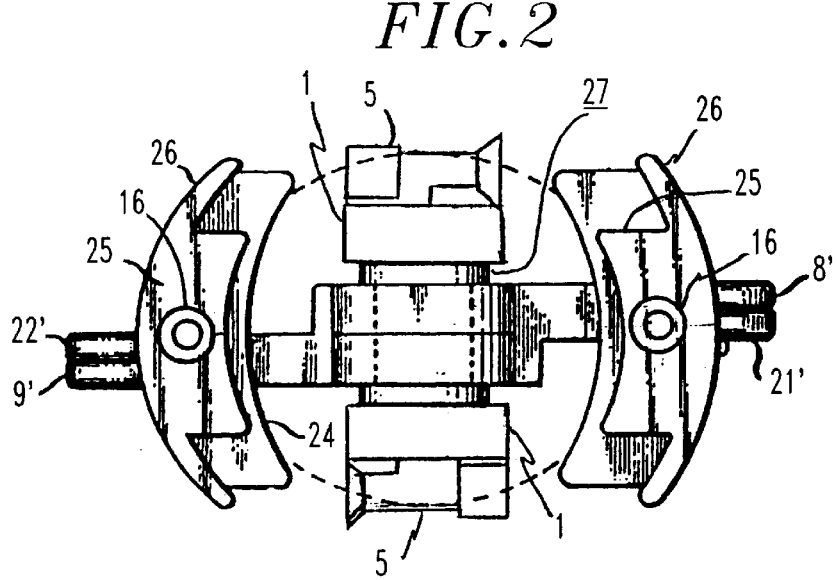
FIG. 2 is a side view thereof, showing other views of the wind gust alleviation devices.

Apparatus 2 shown in FIGS. 1 and 2' would be suspended from a helicopter and designed to scoop up either a person or a lightweight load such as a container, and to transport such a load from one site to another preferred site. The structural design of the apparatus would be similar to those in Gabriel's previous U.S. Pat. Nos. 5,825,826 and 5,868,357.

This apparatus could include wide fingers, as shown in U.S. Pat. No. 5,868,357 for easily scooping up a person. It could include a surveillance camera to assist in locating the load, as shown in U.S. Pat. No. 5,825,826, but not shown in the drawings of this apparatus, because the main improvement has been a means of countering the effects of wind gusts on the apparatus, which would produce swaying motions. FIGS. 1 and 2, apparatus' front and underneath views of the assembly, show eight (8) identical instrument assemblies for blowing blasts of air to oppose the effects of wind gusts on apparatus 2. The apparatus shown in FIG. 1 has two elongated members 21 and 22 pivoted approximately midway by a pivot pin assembly 27. In FIG. 2 note that lower portions 21 and 22 have rounded exterior surfaces to provide less resistance to wind gust effects.

Figure 17:
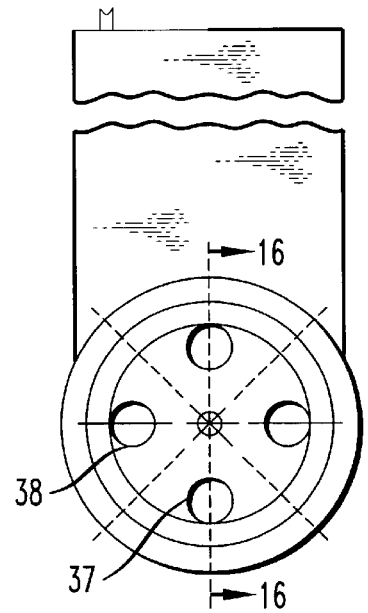
FIG. 17 is a front view of the valve, showing the four holes in each disc completely in alignment, to permit air flow.

Its lower portions have cushions 24, 24' attached to their inside walls to embrace load 17 in place. Each lower portion has an extension 25 to aid in keeping a load in place, by supporting its underneath. The apparatus' upper portions 21' and 22' have weights 8' and 9', inwardly extending bars 3 and 3' with hammerheads 1' and 2 attached. However, these hammerheads could contain electro-magnets, as shown in FIG. 17, U.S. Pat. No. 5,825,826, to provide either attraction or repulsive forces, as required, to aid in separating or closing lower portions 21 and 22.

Figure 3:
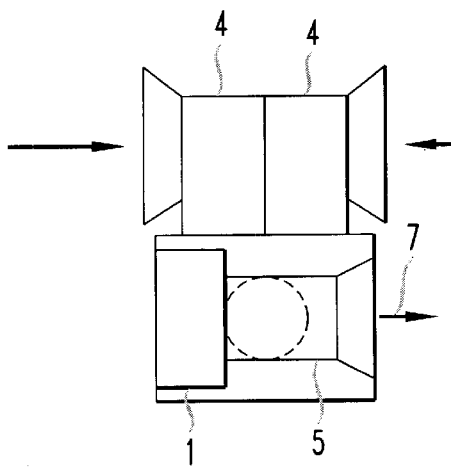
FIG. 3 is a side view of two wind gust alleviation devices.
Figure 4:
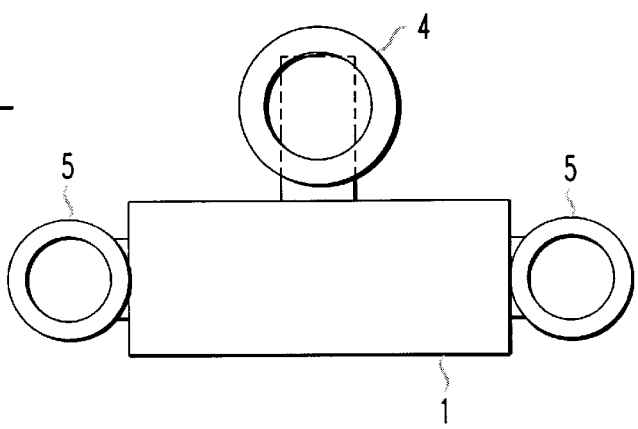
FIG. 4 is a front view thereof.

The wind gust alleviation instruments, mounted on the apparatus are shown in greater detail in FIGS. 3 and 4. FIG. 3 shows a side view, and FIG. 4 a front view of the assembled instrument. Two microswitch assemblies, which sense wind gusts, are shown mounted on top of compressed air tank 1. Also mounted on the tank's sides are solenoid operated valves 5. Each microswitch has a blade on top which, when pressed down, closes the circuit for operating pull-type solenoid, FIGS. 8 and 9, thus opening the valve and allowing a blast of air to pass through from tank 1 to valve opening 13.

An assembly, such as shown in FIG. 3 and 4, is mounted above each unbendable knee of lower portions 21 and 22 and on each pivot pin surface, front and rear, so that a wind gust from either north or south, east or west, would be countered by blasts of air from at least two openings 13, FIG. 8, to oppose the effect of the effect of the load's swaying.

FIG. 8 shows a cross-sectional detail along line 8—8 of FIG. 7 of valve 5, comprising a lightweight elbow, an attached low profile, pull-type solenoid, such as 1EC, Part No. 123421-OXX LEDEX linear solenoid by Lucas Control Systems Products, Vandalia, Ohio. The valve also includes plunger 11, with stop 11', attached to solenoid's shaft. Cylindrical stop 11' prevents plunger 11 from being so wedged into valve seat 12 as to get stuck and become immovable. Inlet air pressure 14 helps keep valve plunger in closed position. When solenoid 10 is energized by supply voltage E, then its shaft pulls in, forcing plunger 11 to open and allow air at 14 to pass through at output 13 with blast 7. With a 10% duty cycle and a stroke of 0.150, the force at 20° C. would be 1 lb. If a longer stroke is required, then size 2 EC, having an outside diameter of 1.125 inches would be substituted for size 1 EC. The stroke's speed would be approximately 8 ms.

FIG. 7 is an end view of the air valve showing the circular shape of low profile LEDEX Solenoid 10. The compressed air tank 1 is fastened air-tight to the top of air valve shown, with the aid of a gasket.

In FIG. 8, the conical end of plunger 11 may be rubber-coated to prevent air leakage, particularly at the top of its protrusion 11', which makes a seal against valve seat 12's lower end. Protrusion or stop 11' also prevents tapered portion of valve from being stuck in its seat, offering little frictional resistance from recessional movement when voltage E, FIG. 9, is applied to solenoid 10.

FIG. 9 is a circuit diagram for a single solenoid-operated valve 5, showing the microswitch in the loop. Each of the 8 valves shown in FIGS. 1 and 2 have the same identical circuit and the same voltage E applied. To conserve pressurized air in tank 1, FIG. 10 is offered. In this circuit valves 5 can only function, if relay 15 is closed. In FIG. 10, the eight circuits each with a solenoid and a microswitch are shown in parallel with a single voltage supply E applied, when relay 15 is closed.

Figure 11:
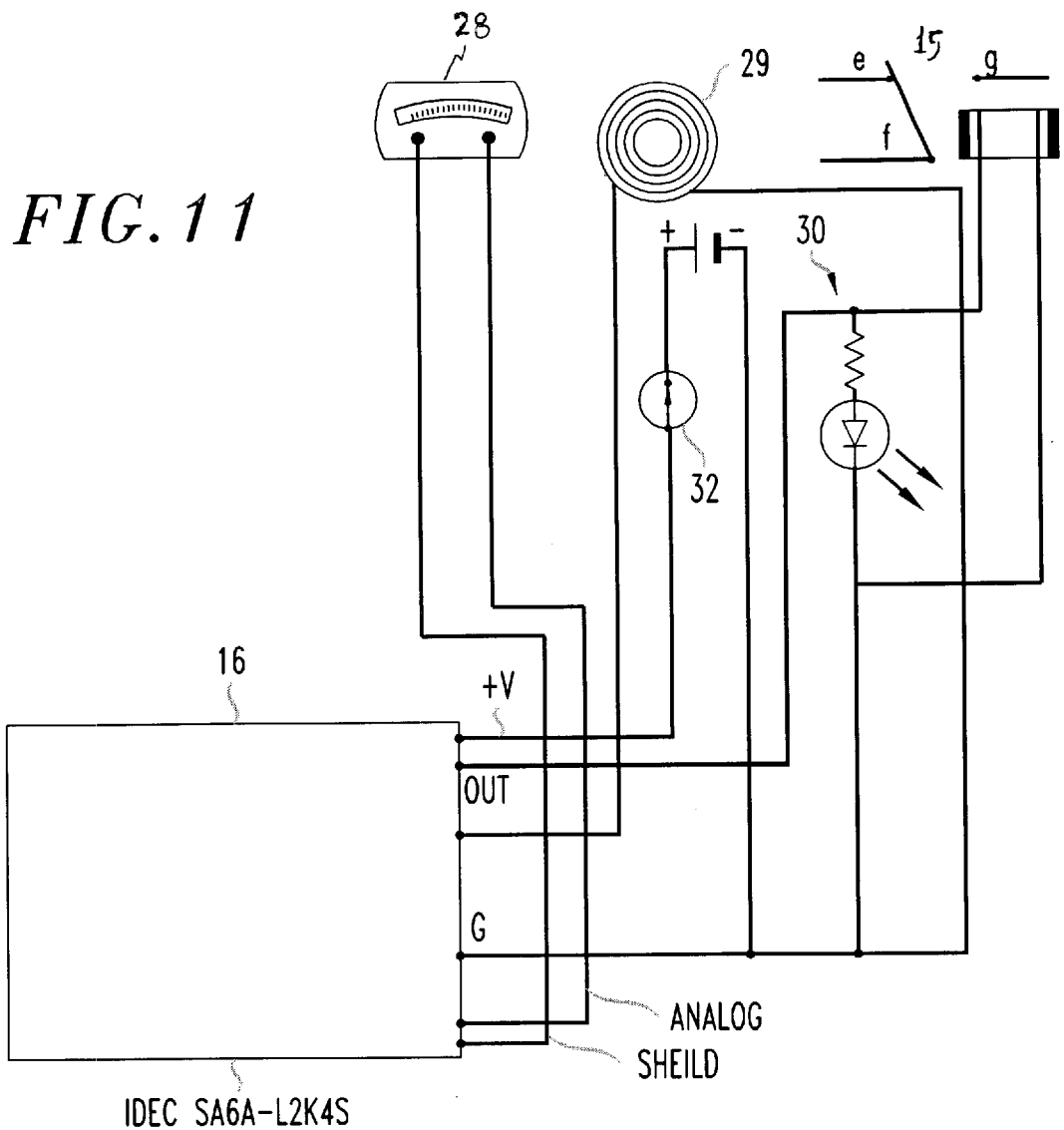
FIG. 11 is essentially a block diagram of the ultrasonic sensor, with external instrumentation.
Figure 12:
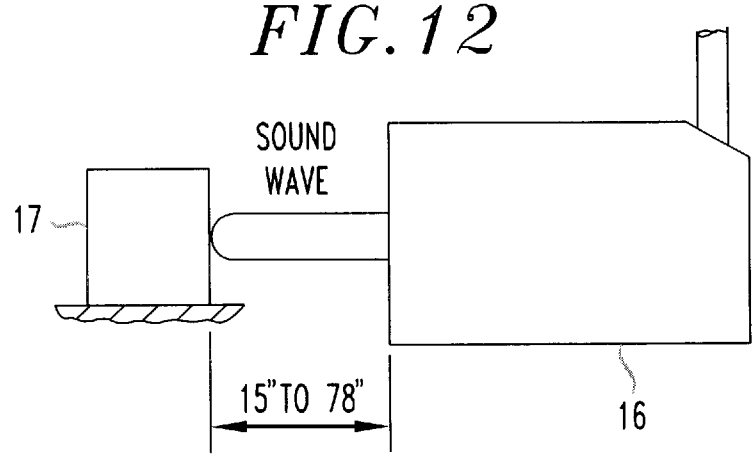
FIG. 12 shows a block diagram of the ultrasonic distance sensor and the containerized load to be sensed.

FIGS. 11 and 12 show a block diagram of distance sensor 16, by IDEC 5A6A-L2 K4S, A model. This model is able to sense distances from 78.74" to 15.75" of the object to be retrieved from either ground terrain or water.

When the apparatus with sensor 16 shown in FIGS. 1 and 2 are within 78.74" inches of the object, then relay 15 automatically closes so microswitch 4, FIGS. 3 to 6 is made active to wind gust pressures. When a microswitch closes, then Solenoid 10 operates to open valve 5 allowing compressed air 14 to pass through and be emitted at exit 7 at very high velocities to counteract the effect of wind gusts on the apparatus. The applicable microswitches close the circuits only when a wind gust occurs. The need for stopping the swaying of the apparatus under wind gust conditions, is most essential at the time when the apparatus is about to be lowered onto an object to be retrieved. That is when the apparatus' precise position is desired. The pilot can only control the helicopter's position over an object on the ground. The pilot cannot stop the apparatus from swaying under wind gust conditions. By allowing this wind gust alleviation technique operate only when the apparatus reaches within 6½ ft. of the object conserves much compressed air in tank 1.

In FIG. 11, circuitry exterior to the Main Circuit of Sensor 16 is shown, including remotely placed distance meter 28, alarm 29, relay 15, voltage supply 30, LED indicator 31 and manual switch 32.

FIG. 12 shows a block diagram of sensor 16, showing the emitted sound wave being reflected against containerized load 17. This sensor is an off-the-shelf item from IDEC Corp., 1213 Elko Drive, Sunnyvale, Calif. 94089-2240, phone 1-800-262-IDEC.

Figure 7A:
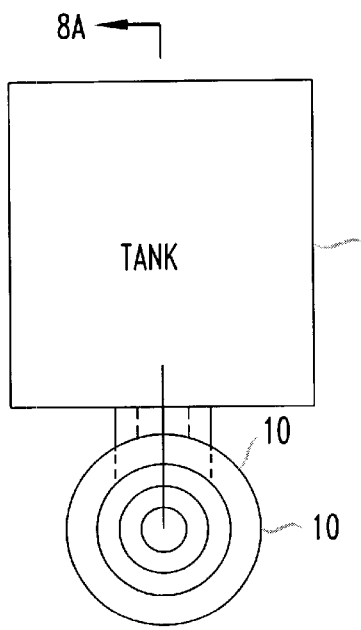
FIG. 7A is an end view of solenoid-operated valve.
Figure 8A:
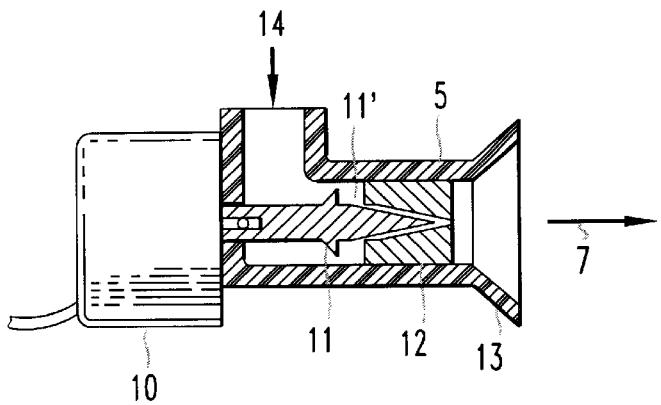
FIG. 8A is a section of the valve taken across line 8A—8A of FIG. 7A.
Figure 9A:
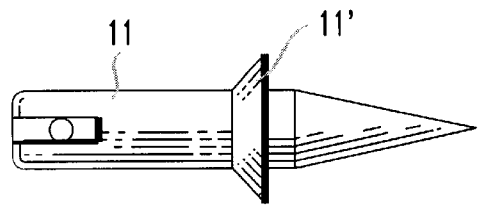
FIG. 9A is a side view of the valve plunger.

To enable one to visualize better the valve's action when linear-motion plunger of solenoid 10 retracts, FIG. 8A is provided. Plunger 11 is shown with its rear end against the flat surface of solenoid 10. FIG. 8A is a section along line 8A—8A of end view, FIG. 7A, showing the compressed air tank. FIG. 8A shows the plunger 11 in its open position allowing air from tank 1 to flow through the valve, emitting at opening 13, as a high velocity blast of air. FIG. 9A shows a detail drawing of the plunger itself. Protrusion 11' may have a rubbery coating on its flat surface to prevent any air leakage in the valve's closed position. It is suggested that plunger 11 be made of a metal that is noncorrosive.

Figure 13:
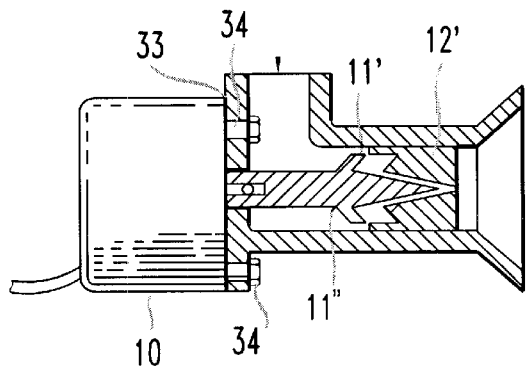
FIG. 13 is another sectional view of the valve showing a modified plunger with a V-shaped protrusion for improved protection from air leakage.

The shape of protrusion 11' of plunger 11, may be V-shaped as shown in FIG. 13 to ensure that an air tight seal is formed when plunger 11' is in its closed position seated against seat 12', surrounding the plunger. FIG. 13 also shows how solenoid 10, an off-the-shelf item, may be fastened to valve structure 5, via two threaded studs and held in place by nuts 34. Circular gasket 33 also is added to the space between the solenoid's flat surface and valve structure 5's flat surface, as shown in FIG. 13, to help maintain air tightness between the two surfaces.

Another Technique For Wind Gust Alleviation of Rescuing Apparatus

Figure 14:
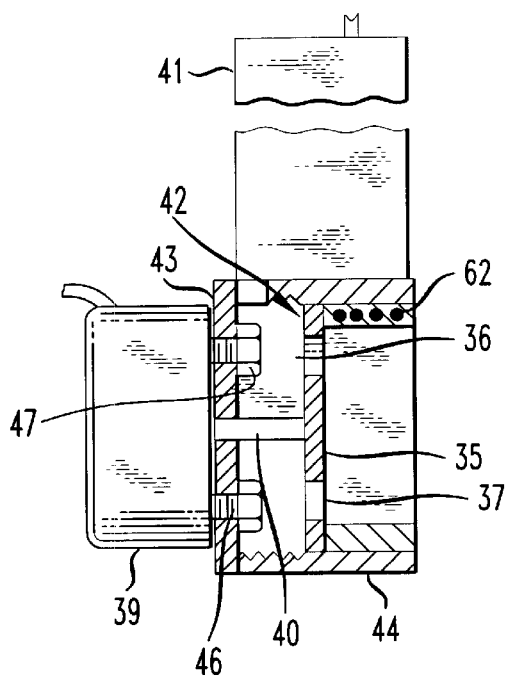
FIG. 14 shows another solenoid valve for allowing air from a compressed air tank to blast through. This is a sectional assembly view of the valve with an attached rotary, low profile pull type solenoid. The valve is in the closed position.
Figure 15:
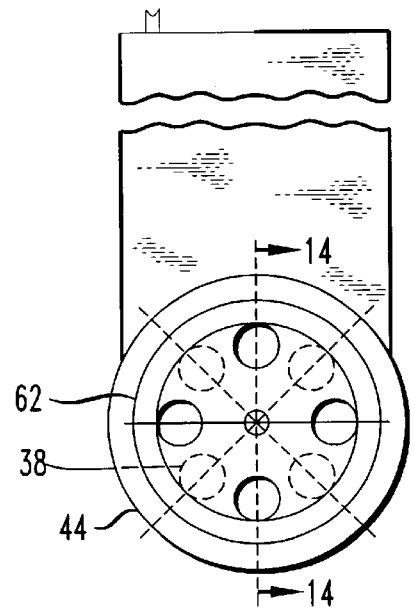
FIG. 15 is a front view of the valve, showing the four holes in each disc of the valve completely out of alignment, to prevent air flow.
Figure 16:
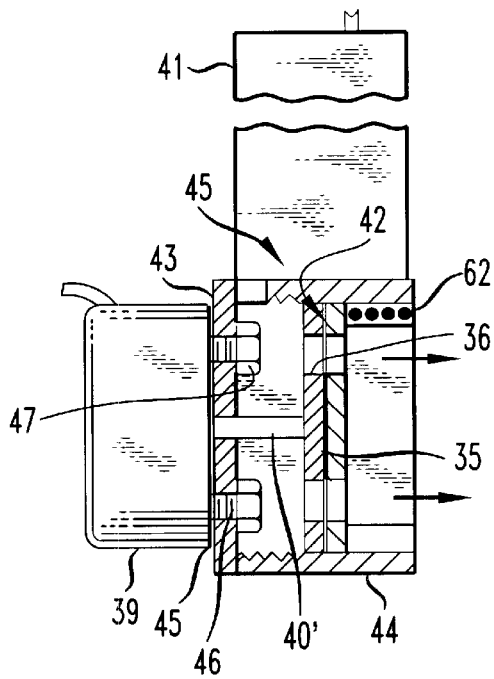
FIG. 16 shows the solenoid valve in the open position, with the four holes, with each disc aligned with the other, so air from the tank can flow through. One disc is air-tightly fixed to the valve's pipe, while the other disc is fastened to the solenoid's shaft and rotatable.

This is technique for allowing air from tank 41 to blast through two discs with holes selectively placed, one disc having a low profile LEDEX rotary type solenoid attached via shaft 40. When power is off to the solenoid, the four holes 37 on disc 35, fixed to pipe 44, representing the valve body, do not coincide with the four holes 38 in disc 36 as shown in FIGS. 14 and 15. Rubber gasket 42 assures air-tightness between discs, 35 and 36, when valve is in closed position. Internal surface of pipe 44 is threaded, as shown, and so is periphery of disc 36, FIGS. 14 and 16. Valve's tightness would resemble a cap screwed on to a jar with the cap having a rubber membrane inside to assure air-tightness. When power is applied to solenoid 39, its shaft 40 rotates 45° to separate disc 36 from disc 35, while enabling their holes 37 and 38 to come into alignment for incoming air from tank 41 to blast out through circular openings 37, as shown in FIGS. 16 and 17. Twice as many openings could be provided, if desired, by adding holes 37 to discs 35 and 36. FIG. 14 is a section along line 14—14 of FIG. 15, while FIG. 16 is a section along line 16—16 of FIG. 17. Tank 41 is fastened air-tightly to pipe 44, with only opening 45 for air to pass through to the valve cavity. Solenoid 39 is sealed to end of pipe 44 air-tightly so no air can leak out, at that end of pipe 44. Plate 43 covers end of pipe 44 with holes for studs 46 and shaft 40. Also a thin gasket 48 exists between face of solenoid 39 and plate 43. Nuts 47 are screwed onto studs 46, prior to installing discs 35 and 36.

Figure 18:
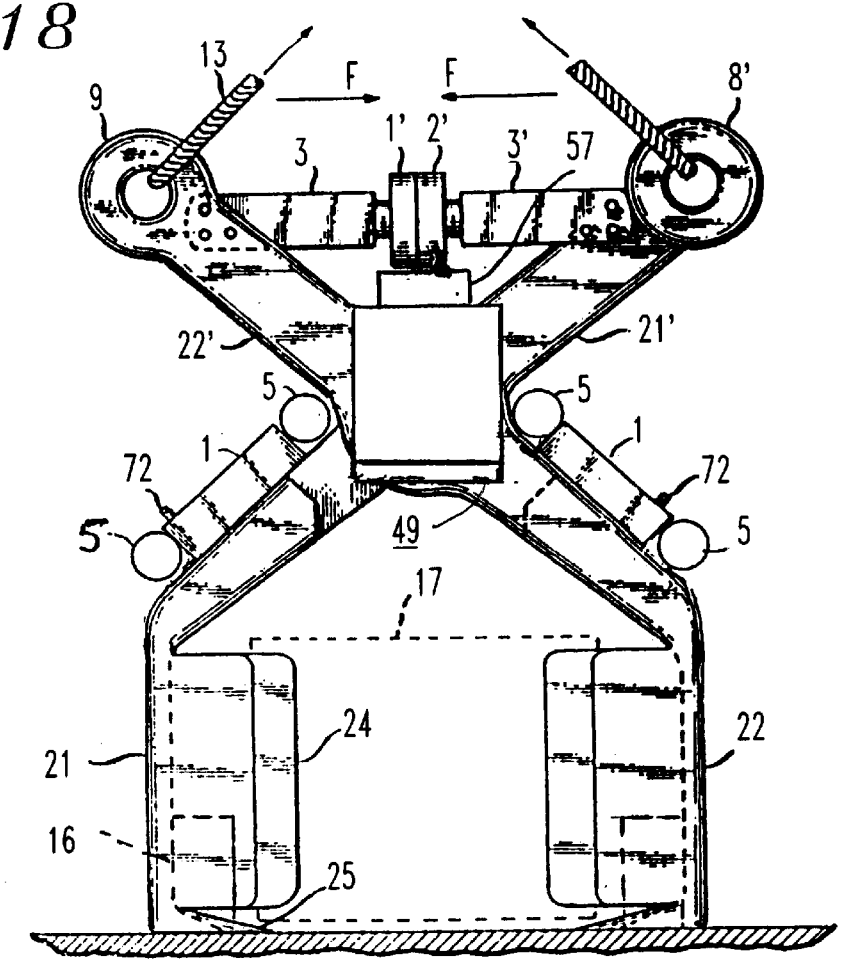
FIG. 18 is a front view assembly of the gyroscope-mounted apparatus for sensing and prevention of swaying of a suspended apparatus.
Figure 19:
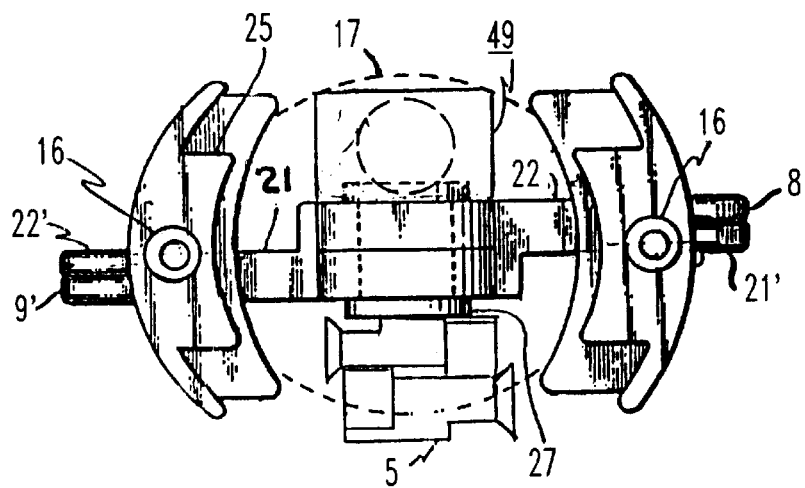
FIG. 19 is a bottom view thereof.

FIGS. 18 and 19 show the front and bottom assemblies of an apparatus with a gyroscope mounted on the surface of its pivot pin 10. Gyroscope 49 senses any swaying movement of the apparatus while in suspension. When an angular movement of gyroscope 49 occurs, it processes about its appropriate axis, according to the three dimensional picture of a gyroscope FIG. 20. If the outer gimbal 53 moves angularly by the amount of angle α, its inner gimbal 52 will remain stationary; if the gyroscope's platform is angularly moved in the horizontal plane angularly, an angle B, the inner gimbal 52 with the spinning wheel 54 will still remain stationary. The gyroscopic behavior is due to the tendency of the spin axis to remain stationary unless physically forced to do otherwise. This property accounts for the application of the gyro as a "special memory" device. Rotor 54 can be considered as a fly wheel spinning at high speed, whose axis is mounted on gimbals which allow the spin axis to remain stationary while the apparatus to which the outermost gimbal is pivotally fastened moves freely.

In FIG. 18, the gyro assembly 49 is attached to the face of pivot pin 27, FIG. 19. On the opposite face of the pivot pin are attached two solenoid-operated air valves. Beneath these valves 5 FIG. 19, may be attached a compressed air tank 1, or two additional tanks 1 may be placed elsewhere on apparatus 60, with tubes or piping connecting an air valve 5 to a tank 1. Numerals 21' and 22' have lead lines pointing to the upper portions of the apparatus, while numerals 21 and 22 have lead lines pointing to its lower portions. Numeral 16 identifies the two 1DEC ultrasonic distance sensors. Numeral 24 identifies the cushion attached to each of the two lower portions inner surfaces. Numerals 3 and 3' identify the two upper inward projecting bars, each supporting a hammerhead.

Figure 20:
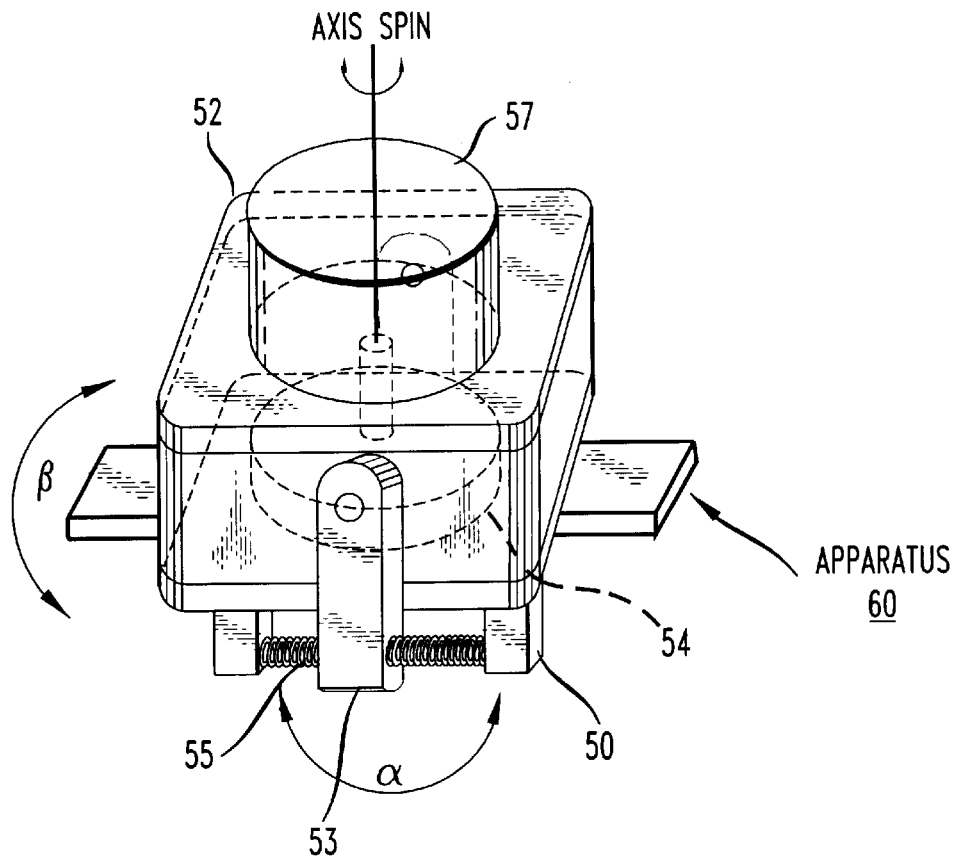
FIG. 20 is a 3-dimensional view of a single gyroscope with microswitches as mounted thereon for responding to displacements in its gimbals.
Figure 21:
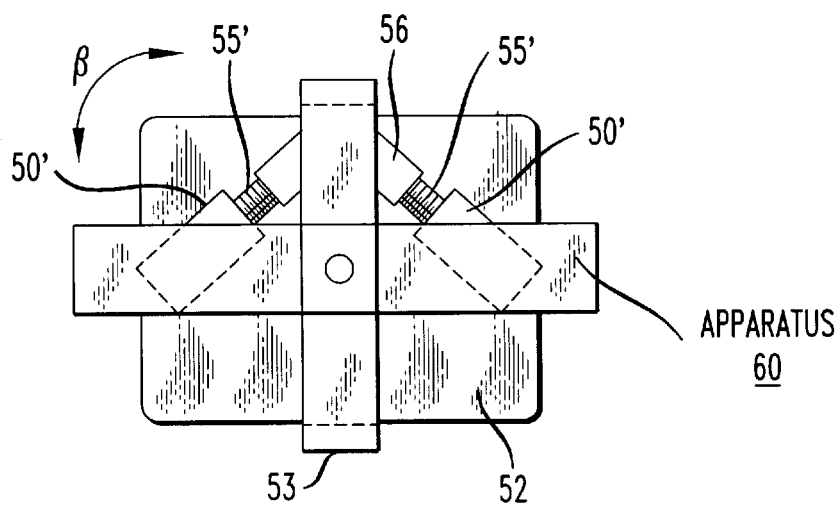
FIG. 21 is a two-dimensional bottom view of the gyroscope showing two additional microswitches.

In FIG. 20, the gyroscope assembly, motor 57 has its shaft connected to the gyro spin rotor which is enclosed inside enclosure 52. Enclosure 52 is pivotally supported by inner gimbal 53. When gimbal 53 swings sideways by angle α in accordance with the swaying motion of Apparatus 60, suspended by hoist cable 13, FIG. 1, coiled springs 55 attached to gimbal 53 and microswitch 50, become compressed and extended alternately. Every time a spring 55 is compressed a switch 50 is closed, and an air valve 5 is momentarily opened, allowing a blast of air to be discharged at its opening to counter or act against that particular swaying motion. If the swaying motion is in the circular direction, then Springs 55', FIG. 21, are compressed and extended alternately by the motion. Each time a spring 55' is compressed, a microswitch 50' is closed, and an appropriate air valve 5 is momentarily opened, allowing a blast of air to be discharged at its opening to oppose the undesirable motion. Hence, Apparatus 60 is urged, incited, to remain stationary except for its vertical motion of descending to the object to be scooped up. Spring 55', FIG. 21, has its ends fastened to microswitch 50' and projection 56. Gyroscope assembly 49 is mounted on apparatus 60 so it can rotate an angle B.

The anti-apparatus-swaying techniques described and shown herein may be applied to improve the landing safety of light aircraft. Strong wind gusts could cause the aircraft to be pushed off the runway upon landing. Compressed air tanks may be placed under the aircraft's belly and the microswitches and air valves could be mounted on its fuselage's sides. The switches would close under the wind gust's pressure, enabling the solenoided-operated air valves to open and produce a blast of air to counter and oppose the wind gust's effect on the fuselage.

Figure 22:
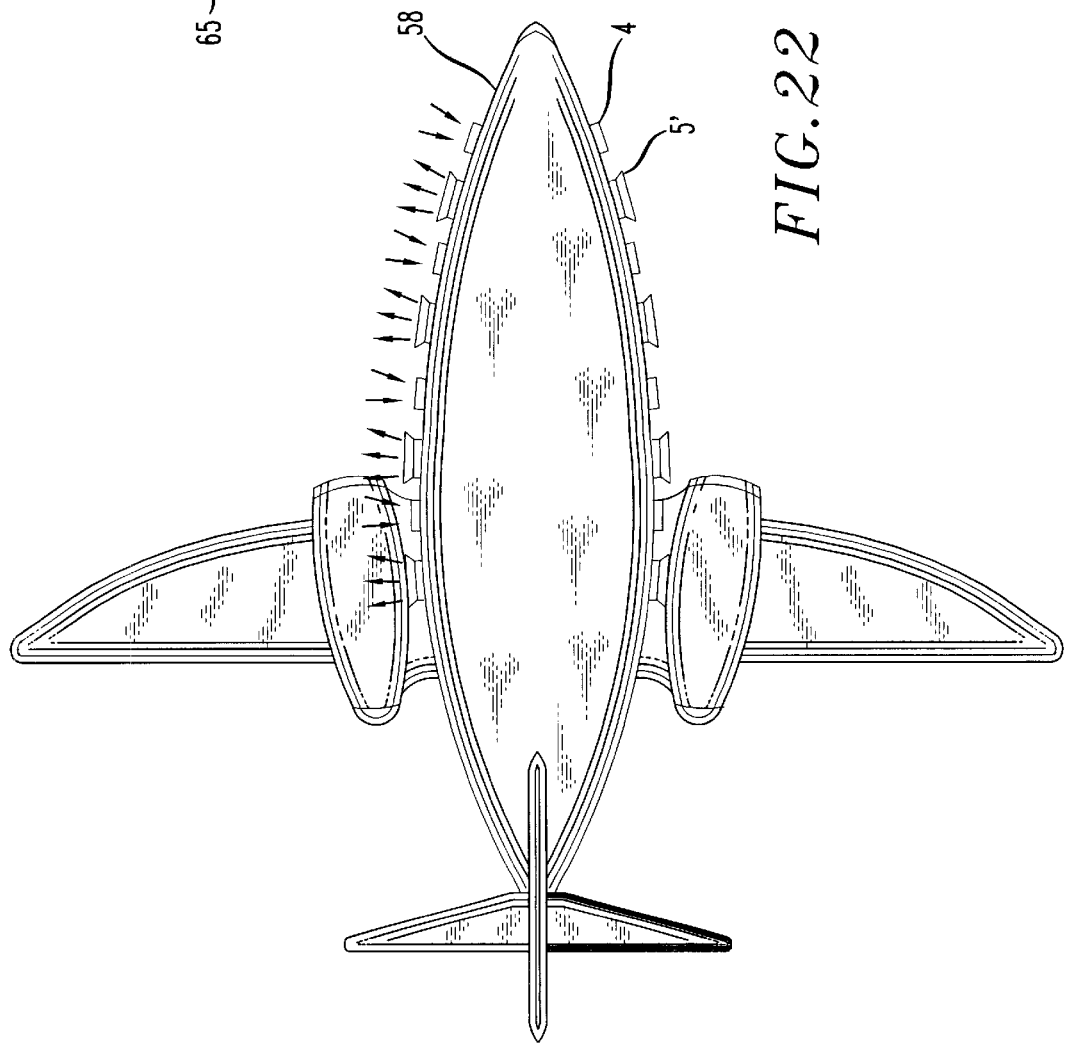
FIG. 22 shows the top view of an aircraft with wind gust components mounted thereon.
Figure 23:
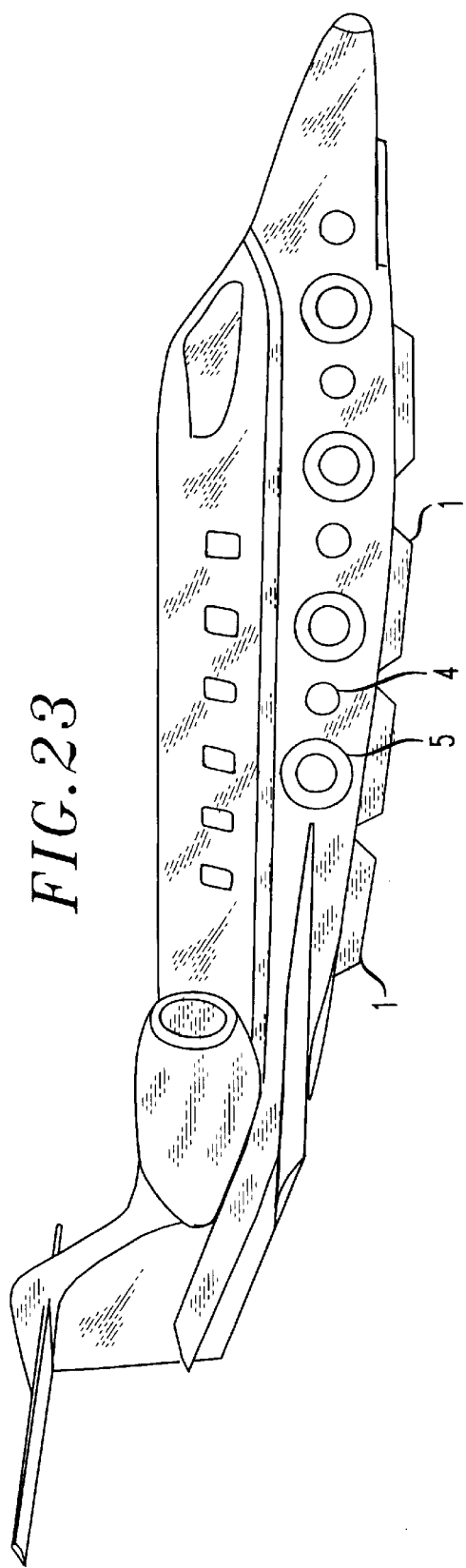
FIG. 23 shows the side view of a similar aircraft with wind gust alleviation components mounted thereon.

The enclosed aircraft drawings FIGS. 22 and 23 show how the anti-wind gust system would work.

Figure 24:
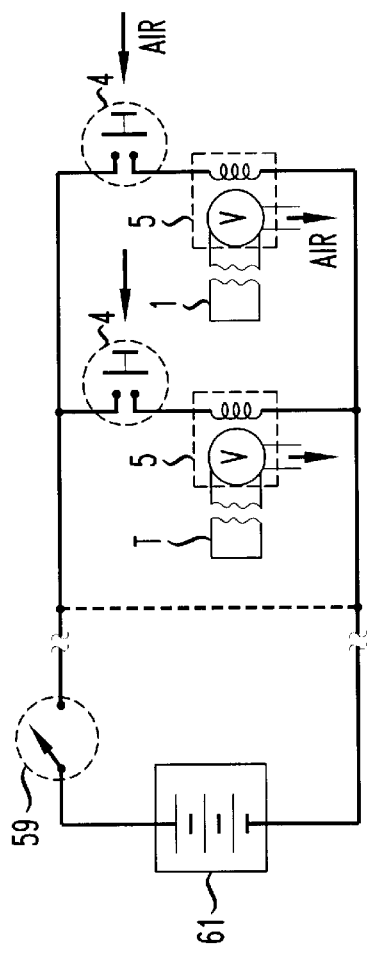
FIG. 24 is a schematic diagram showing the interconnections for the microswitches, solenoid-operated valves and the voltage source.

FIG. 23 shows the side view of a winged aircraft with solenoid-operated air valves 5 and microswitches 4 installed on both sides of the aircraft's fuselage 58. Only the inlet and outlet flared openings are shown. Bodies of the valves and switches are imbedded within the fuselage as well as the conductors and any pipes interconnecting the devices. The wiring schematic for the interconnecting wiring is shown in FIG. 24. Manual switch 59 would be located in the A/C cockpit, voltage supply 61, too.

Figure 5:
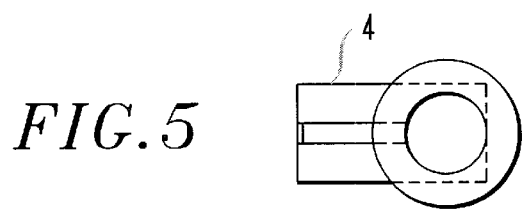
FIG. 5 is a top view of a microswitch sensitive to wind gust effects.
Figure 6:
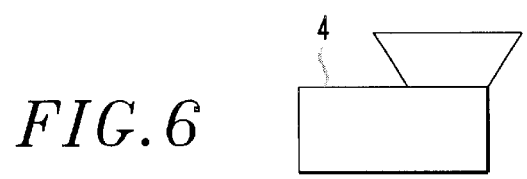
FIG. 6 is a side view thereof.

Although four air outlets are shown, there could be more to assure sufficient air blasts to counter the effect of the wind gust. As many microswitch air inlets are shown as air outlets 5. Although one (1) tank 1' is shown for each air valve 5' in schematic, FIG. 24, one tank could supply air for two valves, in order to reduce the number of tanks of compressed air. The valve design is shown in FIGS. 14 to 17. The microswitch outlines are shown in FIGS. 5 and 6. The microswitches are off-the-shelf items, available from Mouser Electronics Catalog, page 280. From examination of the wind gust alleviation system for the aircraft, one would conclude that this system is simpler than for the suspended apparatus. With the aircraft system, only two fuselage sides require valves and switches, instead of four sides. In addition, 1DEC distance sensors 16, FIGS. 1 and 2, are not required. Nevertheless, the gust alleviation system works and performs in the same manner, utilizing the same physics law, for both the aircraft and the suspended apparatus. It should be noted that the aircrafts shown in FIGS. 22 and 23 are not the same. The aircraft in FIG. 23 is the German air rescue O-CCAA, DRF, with the pontoons omitted.

Figure 25:
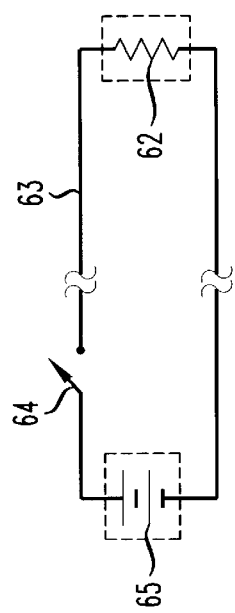
FIG. 25 is a wiring diagram for the heating pad within the outlet of the solenoid-operated air valve.

Now returning to FIGS. 14 to 17, showing the front and cross-sectional views of the air valve, a heating pad 62 is added to the interior surface of nipple or enclosure 44. A voltage would be applied to it, via a toggle switch 64, electrical wiring 63 and a separate voltage source 65, as shown in FIG. 25. In snowy and icy weather, one would close switch 64, to allow heating pad to warm up and melt away any accumulated snow or ice, so air from the compressed air tank can easily blow through, when required. The heating pad would be coated with a pliant, long-lasting substance to withstand high and low temperatures and other climatic conditions to which it would be exposed. When installing the air valves, whether it be on the apparatus or on the aircraft fuselage, enclosure 44 would be tipped slightly downward to enable any accumulated water to run off into the atmosphere.

As an example of heating filaments, resistors, that melt snow, consider defrosters, fastened to automobiles' rear windows which defrost and melt snow. In FIGS. 14 and 16, it is noted that in addition to shaft 40 rotating 45°, the shaft retracts a small amount in FIG. 16. To permit this linear movement of shaft 40, either that much play needs to be provided in shaft 40 or disc 36 must be allowed to move that amount along shaft 40. The latter is shown in FIGS. 14 and 16, via keyway 40' in shaft 40 and projection 36' from disc 36 into slot 40'. Now disc 36 can move backward, as it rotates 45°, to its position shown in FIG. 16.

Figure 26:
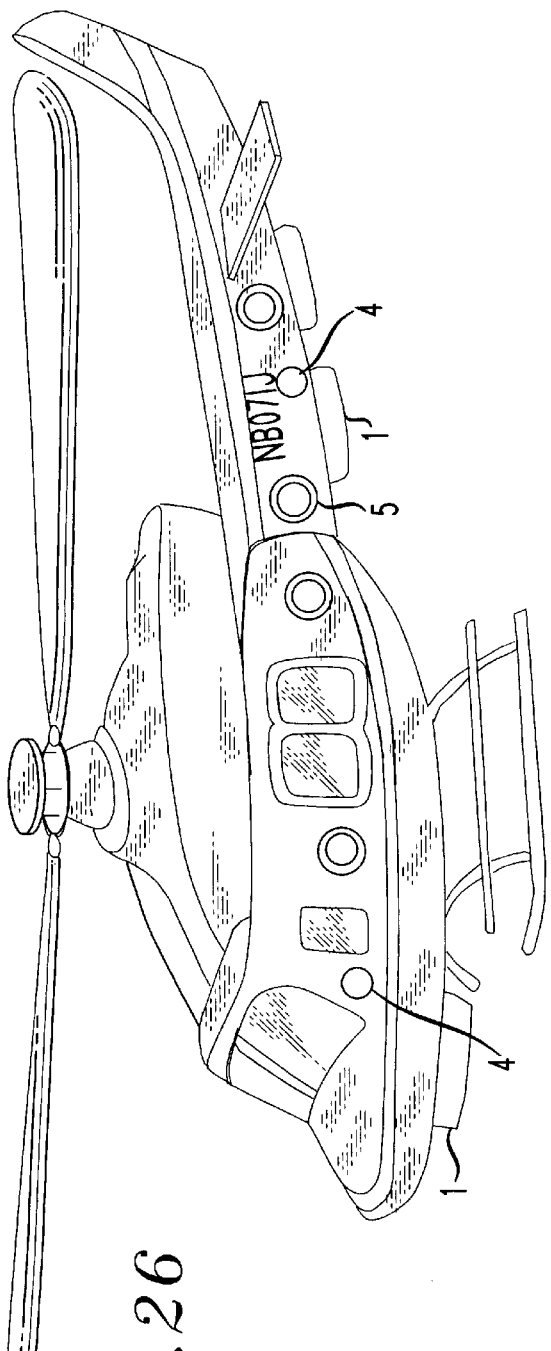
FIG. 26 is a side view of a helicopter showing locations for the air valves and the micro switches.
Figure 27:
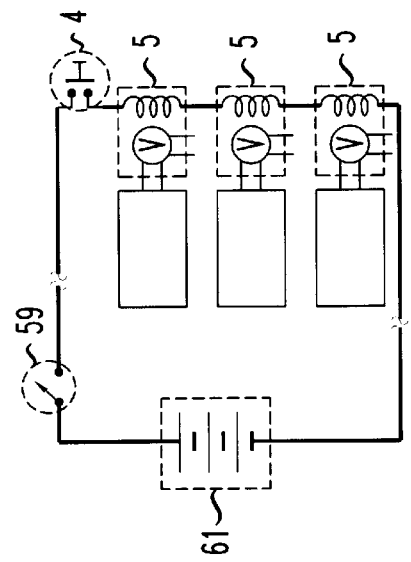
FIG. 27 is a wiring diagram for three sir valves and one micro switch and a manual switch, all supplied with a single voltage source. When the manual switch and the micro switch are closed, then the air valves open to allow air to be blasted out into the atmosphere as the solenoid coils are connected in series. The solenoid coils may be connected in parallel to each other and still require one micro switch to open all valves simultaneously.

FIG. 26 shows the side view of a helicopter, with air valves 5 and microswitches 4 installed on the side of its fuselage. Bodies of the valves and switches with their electrical interconnections are mostly imbedded within the fuselage. Although four air outlets 5 are shown, there could be more to assure sufficient thrust is produced by the air blasts to counteract the pushing effect of severe wind gusts. Two micro switch-air-inlets are shown. One micro switch 4 could be wired to turn on as many air valves as one desires. In FIG. 27, a single micro switch is shown to turn on three air valves, when closed. Also, one air tank could supply compressed air to two air valves via piping Gates or other type valves could be added to the connecting piping to prevent any air leakage, when the wind-gust alleviation system is not in use.

Figures 28, 29:
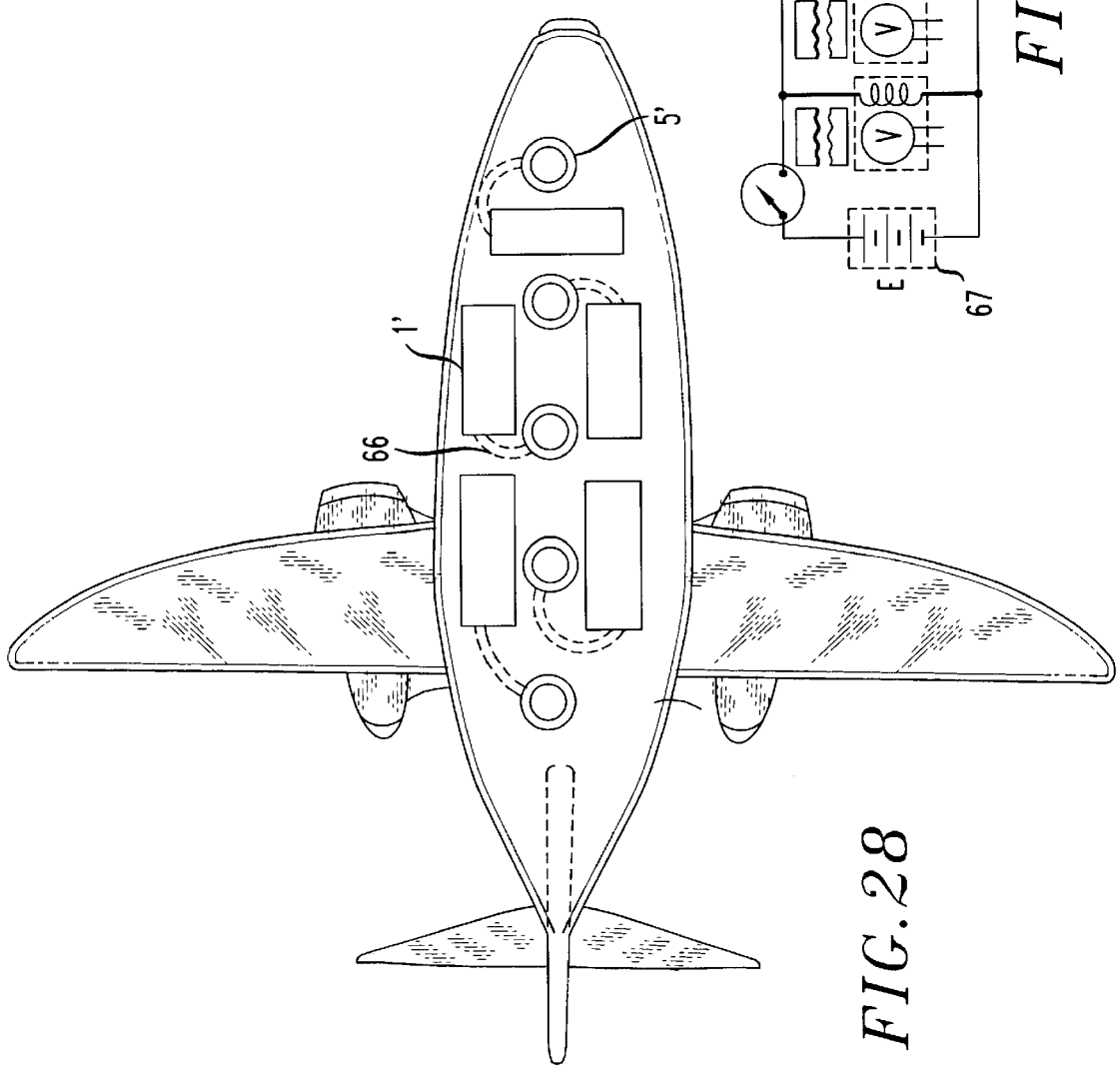
FIG. 28 shows the bottom view of a fixed-wing aircraft, with compressed air or gas tanks and air valve openings distributed throughout its belly.
FIG. 29 is a schematic diagram of the solenoid-operated air valves connected in parallel with each other. In series with the solenoid coils is a single manual valve. The solenoids receive power from a single voltage supply.

The solenoid-operated air valves may be applied to the belly of an aircraft, as shown in FIG. 28. The aircraft could be a helicopter, as well as the fixed wing shown. The landing gears have been omitted to clearly show compressed gas tanks 1' and air valve 5' outlets. These air valves and outlets may be ten times the size of the ones used for apparatus 2, since the apparatus may weigh 50 lbs., while the aircraft may weight 5,000 lbs., with the people and fuel aboard. Shown in FIG. 28 are five tanks 1' land five air valves 5', one tank per air valve 5', although two tanks 1' could supply one air valve. The belly of the aircraft is shown with suggested locations for tanks 1' and air valve 5'. The outlets, with the aircraft in flight, would face downward, so that a blast of air or gas from all five outlets would provide buoyancy for the aircraft and avoid its taking an unwanted nose dive. In addition, with the air blasts going, the craft would experience a safe landing. This effect is accomplished through a law in physics, which says for every action, there is a reaction. In FIG. 28, piping 66 connects outlet of tank 1' to inlet of air valve 5'.

The circuitry for the aircraft buoyancy system is shown in FIG. 29, in which voltage supply 67 is connected electrically to the coils of the air valve solenoids 5', via manual switch 68. When switch 68, located in the cockpit of the aircraft, is closed by the pilot, all air valves are opened by their solenoids and discharge blasts of air vertically downward from the aircraft's belly, to avoid a free fall of the aircraft until the pilot can regain control with his instruments and surface controls. Tanks 1' would be considerably larger than those on the apparatus, so would be air valves 5'.

FIGS. 30 to 33 show another valve design similar to those shown in FIGS. 14 to 17, except this valve may be simpler to fabricate, as the threads on disk 36, FIG. 14 are not needed. Unlike valve shown in FIG. 14 having a solenoid with a rotary shaft, valve shown in FIGS. 30 to 33, shows a solenoid with a retracting plunger, when energized.

Enclosure 71, cover 82, solid disc 69 with round protrusions 73, perforated disc 70 are preferably made of plastic to keep the weight of the valve to a minimum. Some plastic materials are long lasting, such as pipe used in plumbing fixtures. FIGS. 30 to 33 are not drawn to scale. The actual valve could be the size shown, smaller or larger, as well as low profile LEDEX solenoid 72. Regarding plastic materials, it is important to use materials whose contacting surfaces do not offer much resistance when rubbing against each other, yet provide air tightness. When protrusion 73, FIG. 32, inserted in hole 79, FIG. 33, is retracted by pull shaft 80 of solenoid 72, very little suction should take place, using the proper contacting materials. When retracting, disc 69 uncovers hole 76, FIG. 33, to allow air from tank 1 to enter valve and pass through the four holes 74, FIG. 31, and blast out of opening, FIG. 33. The holes in disc 70 are flared at inlet and outlet to reduce air friction. Holes 74 may be larger than shown in FIG. 31 to allow more air to pass through, if desired.

Tank 1 is connected to the valve by pipe 75, FIGS. 32 and 33, with gate valve 77 inserted, to enable one to close the valve and prevent air from entering, in case the valve leaks air. To enable one to fill air or gas into tank 1, an air valve 83, such as on an auto tire, is provided.

In FIG. 32, a resilient membrane 84 is fastened to stationary disc 70 to provide air-tightness and help prevent the leakage of air through the valve. Thus, with the membrane in place, the need for air-tightness between round tapered projection 73 and tapered opening 79, when the two are engaged as in FIG. 32, may not be as essential.

I claim:

1. An automatically-actuated apparatus for suspension from an aircraft capable of hovering, in its hover mode, for accommodating a load, including a or an inanimate cargo, consisting of two elongated halves, each half being held together by a main pivot pin, with front and back surfaces and each half including an upper portion and a lower portion, said lower portion having an unbendable knee, each upper portion being configured for use with at least one hoist cable; the lower portion being an inwardly projecting extension at its bottom, each extension having an end, and each elongated half having an inside wall surface; at least one cushion being attached along each of said inside walls; each upper portion having a bar inwardly extending from an inside surface, each bar having a hammerhead, with a face, extending toward the other, the hammerheads when abutting, receiving the major structural compressive stresses imposed by the horizontal components of said hoist cables, when supporting said load; a securing means for helping to keep said load in place on each of said extension, thus helping to provide positive secure retention for the load either being retrieved or rescued; each said upper portion having a weight on top, each said weight assisting in said lower portion's separation at said apparatus' touch-down, the improvement being provision for minimizing the swaying of the apparatus while being suspended, such provision consisting of at least one tank for holding a predetermined quantity of compressed air, selectively on said apparatus to counter the efforts of a wind gust blowing in any direction, including back and forth and sideways, two sensitive micro switches and to sense wind gusts two solenoid air valves selectively placed on or near the tank to blow high pressure, each of said microswitches inserted in a flared opening to receive the effect of the wind gust, and each solenoid valve having an inlet port communicating with said tank, an outlet port adapted to immediately react to the wind gust with a burst of air, the Micro Switches™ closing an electrical circuit for providing an open condition of each of said solenoid valves for allowing compressed air in said compressed air tank to pass there through for allowing said burst of compressed air to occur in a same direction as the wind gust, to counter the effect of the wind gust so said apparatus can more safely and precisely position itself over an object to be scooped up.

2. An automatically-actuated apparatus in accordance with claim 1, wherein said lower portions include at least one ultrasonic distance sensor emitting a sensor signal reflecting from the surface below for providing a sensory indication to a pilot of a helicopter that said lower portions are at a predetermined distance above the surface or terrain below, said sensor also containing a relay to close the circuits of said micro switches, enabling the provision for said wind gust alleviation to become active and counter the effect of any wind gust occurring, thus allowing said apparatus to precisely position itself directly above the load to be scooped up, hence improving the reliability and ability of the apparatus to rescue and retrieve objects, whether human or inanimate; by enabling the distance sensor to activate the circuits of the Micro Switches, the tank's compressed air supply thus being conserved.

3. An automatically-actuated apparatus in accordance with claim 1, wherein one or more of said tanks are located above said knee of said lower portions; and also one or more of said tanks being attached to said surfaces of said main pivot pin, to provide alleviation for wind gusts approaching the apparatus in any of four directions,—east, west, north and south.

4. An automatically-actuated apparatus in accordance with claim 1, wherein said flared opening for said Micro Switches being provided and fitted with a loose weather proof membrane to allow said wind gust to operate said switch, without allowing rain and snow to enter therein.

5. An automatically-actuated apparatus in accordance with claim 1, wherein said valve has a body, an air inlet, an air outlet and an attached, pull-type low profile solenoid, with a shaft coupled to a cylindrical, tapered plunger, said plunger snugly fitting into a tapered hole within the body of said valve, said plunger having a rubbery sleeve to provide air-tightness when said valve is in a closed position, said shaft to extend into said body of said valve by way of a grommet to provide air-tightness, so when said valve plunger is in a closed position, no air leaks out of said valve; when said valve plunger is in an open position, all of the air entering said valve inlet passing through the valve's outlet.

6. An automatically-actuated apparatus in accordance with claim 1, wherein said valve has a body, an air inlet, an air outlet and an attached, pull-type low profile solenoid, with a shaft coupled to a cylindrical cone-shaped plunger, said plunger snugly fitting into a cone-shaped cavity within said body, said plunger having a protruded ring with a flat inside surface about midway of its entire length to provide an insertion stop, so as to prevent said plunger from getting stuck within said cone-shaped cavity, said flat inside surface of said ring having a substance to provide air tightness when said plunger is in a closed position.

7. An apparatus in accordance with claim 1, wherein said flat inside surface of said protruded ring about the circumference of said plunger is V-shaped to provide improved air-tightness when said plunger is in a closed position, said V-shaped ring to include a substance about its surface to ensure air-tightness.

8. An automatically-actuated apparatus in accordance with claim 1 wherein said each solenoid valve includes a cylindrical body, said inlet port, said outlet port, a first perforated disc, a second perforated disc, each of the solenoid valves being operated by a rotary solenoid, said first through perforated disc having at least two first apertures formed therein and there through, said first perforated disc being coupled to a shaft of said rotary solenoid for selective rotary movement between said open condition and a closed condition, said first perforated disc further including external threads formed on its peripheral edge, said external threads being selectively sized for engaging internal threads selectively placed and formed in the interior of said cylindrical body for providing selective linear movement of said first perforated disc along an axis of said shaft while and when said first perforated disc is moving between said open condition and said closed condition, said shaft having sufficient linear play to allow linear movement of said first disc, said second perforated disc including a sealing means on its rear face, said second perforated disc further including second through apertures formed therein and there through, said second through apertures being arrayed for matching the size and quantity of said first apertures, while and when said first perforated disc is in said open condition for allowing communication between the first apertures and said second apertures, said sealing means providing an air-tight seal when and while said first perforated disc is in said closed condition for preventing communication of said first apertures with said second apertures.

9. An automatically-actuated apparatus in accordance with claim 1, in which a miniature gyroscope with an enclosure is added to said apparatus, said gyroscope to include and support four Micro Switches selectively mounted on said gyro's gimbals to sense swaying of said apparatus in pole-like directions, thereby actuating Micro Switches, one Micro Switch being operatively and electrically, connected to solenoid-operated air valves in a dampening control circuit to effectively dampen the swaying motion of said apparatus, said control circuit having at least two air valves being operatively-connected therein, a dampening outlet port for each air valve being provided, at least two air valves being provided at each of the pole-like directions for opposing and dampening the swaying motion with blasts of air.

10. An apparatus in accordance with claim 8, wherein said air outlet of said cylindrical body of said air valve having an interior surface and having a heating pad inserted and fastened to said interior surface of said outlet, said pad being electrically connected to a toggle switch and a voltage source; when said switch being manually closed, said pad heating and melting any accumulation of snow or ice on said outlet's interior surface to allow free passage of air flow, said cylindrical body being tipped slightly downward to permit any accumulated water to flow out of said outlet.

11. An automatically-actuated apparatus in accordance with claim 8, wherein said solenoid shaft having an elongated keyway slot and said first perforated disc having a key fitting into said slot slidably to move a selective amount, thus allowing forward motion of said first disc, in order to form an air-tight seal between said first disc and said second disc to prevent air flow to said outlet port.

12. An automatically-actuated apparatus in accordance with claim 1, wherein each of said solenoid valves includes a cylindrical body, said inlet port, said outlet port, a first essentially solid disc opaque to air flow, a second perforated disc, each of the solenoid valves being operated by a solenoid capable of having linear shaft movement, said first disc having at least two added-on round protrusions, said second disc having an equal number of apertures, as said protrusion, formed therein and there through, said apertures sized to accommodate said protrusions; when said valve being in a closed condition, said first disc both covering said inlet port, with its thickness, and forming an airtight seal between said first and second discs, when power to said solenoid is off; when power to said solenoid is turned on by closing said circuit, said shaft retracting a specified, pre-determined amount to both uncover said inlet port and have said protrusions retract from said apertures, thus allowing the passage of air from said inlet port to said outlet port to produce the desired burst of air.

\* \* \* \* \*